United States Patent [19]
Song et al.

[11] Patent Number: 6,163,356
[45] Date of Patent: Dec. 19, 2000

[54] LIQUID CRYSTAL DISPLAY WITH ENHANCED GATE PAD PROTECTION AND METHOD OF MANUFACTURING THE SAME

[75] Inventors: In-Duk Song, Kyungsangbook-do; Jeom-Jae Kim, Seoul; Chul-Ha Chang, Kyunggi-do, all of Rep. of Korea

[73] Assignee: LG Electronics, Seoul, Rep. of Korea

[21] Appl. No.: 08/899,600

[22] Filed: Jul. 24, 1997

[30] Foreign Application Priority Data

Apr. 3, 1997 [KR] Rep. of Korea ................... 97-12327

[51] Int. Cl.⁷ .................................................. G02F 1/1345
[52] U.S. Cl. ............................... 349/152; 349/43; 438/30
[58] Field of Search ........................... 349/43, 147, 151, 349/140, 152; 257/57, 72, 203, 748, 454, 676; 438/30

[56] References Cited

U.S. PATENT DOCUMENTS

| | | | |
|---|---|---|---|
| 4,960,719 | 10/1990 | Tanaka et al. | 438/158 |
| 5,065,202 | 11/1991 | Tanaka et al. | 29/78 |
| 5,483,082 | 1/1996 | Takizawa et al. | 257/59 |
| 5,748,179 | 5/1998 | Ito et al. | 349/152 |
| 5,777,702 | 7/1998 | Wakagi et al. | 349/47 |
| 5,811,318 | 9/1998 | Kweon | 438/30 |
| 5,835,177 | 11/1998 | Dohjo et al. | 349/147 |
| 5,889,573 | 3/1999 | Yamamoto et al. | 349/152 |
| 6,028,652 | 2/2000 | Dohjo | 349/139 |

FOREIGN PATENT DOCUMENTS

| | | |
|---|---|---|
| 4339721 C1 | 2/1995 | Germany . |
| 196230 69A1 | 3/1997 | Germany . |
| 7-92497 | 7/1995 | Japan . |
| 2311159 | 9/1997 | United Kingdom . |

Primary Examiner—Kenneth Parker
Attorney, Agent, or Firm—Birch, Stewart, Kolasch & Birch, LLP

[57] ABSTRACT

The method of manufacturing a liquid crystal display includes the step of forming, on a substrate, a gate line, at least one gate electrode branching out of the gate line, and a gate pad disposed at an end portion of the gate line. Then, a gate insulating layer is formed over the substrate and on the gate line, the gate electrode and the gate pad, and a dummy gate pad is formed on the gate insulating layer over at least a portion of the periphery of the gate pad. The dummy gate pad prevents etchant used during the fabrication process of the liquid crystal display from penetrating into the periphery of the gate pad.

11 Claims, 15 Drawing Sheets

Fib. 11c

LIQUID CRYSTAL DISPLAY WITH ENHANCED GATE PAD PROTECTION AND METHOD OF MANUFACTURING THE SAME

BACKGROUND OF THE INVENTION

1. Field of the Invention

The present invention relates to an active matrix liquid crystal display (AMLCD) and more particularly to an AMLCD including a thin film transistor (TFT) and a pixel electrode, which is connected to the TFT, and a method of manufacturing the same wherein the number of processing steps is reduced.

2. Description of the Background Art

Among display devices, cathode ray tubes (CRTs) have been widely used to display picture images. However, cathode ray tubes are being replaced with thin film type flat panel display devices because flat panel display devices are relatively thin and light weight. Also the response time, and therefore the quality, with which the moving pictures are displayed by flat panel display devices is as fast as cathode ray tubes. Thin film type flat panel displays are actively being developed and studied.

The operational principle of the AMLCD uses optical anisotropy and polarization characteristics of liquid crystal materials. The liquid crystal molecules are relatively thin and long, and have directional and polarizational characteristics. Using these characteristics, the direction in which the liquid crystal molecules are arranged can be controlled by artificially generating an electric filed. Depending on the arrangement direction of the liquid crystal molecules and using optical anisotropy of the liquid crystals, light is allowed to either pass through the liquid crystal or is prevented from passing through the liquid crystal.

Recently, active matrix liquid crystal displays which include TFTs and pixel electrodes arranged in an array have received much attention because they provide enhanced picture quality and natural colors.

The structure of a conventional liquid crystal display is described below. The conventional liquid crystal display includes two panels each having many elements therein, and a liquid crystal layer formed between the two panels. The first panel is also known as the "color filter panel" and contains elements necessary to generate color.

The color filter panel includes red(R), green(G), and blue (B) color filters sequentially arranged to correspond with an array of pixel electrodes disposed in the second panel. Between these color filters, a thin black matrix is formed. The black matrix clarifies the boundaries between different color filters and prevents the generation of a mixture of colors. On the color filter layer, a common electrode is formed. This common electrode functions as one electrode for applying an electric filed to the liquid crystal.

On the other side of the conventional liquid crystal display, the second panel includes switching elements and conductive lines for applying an electric field to the liquid crystals. The second panel is often known as the "active panel". The active panel includes a plurality of pixel electrodes corresponding to positions of pixels, formed on a transparent substrate. These pixel electrodes face the common electrode formed on the color filter panel, and function as the other electrode for applying an electric field to the liquid crystals.

In the horizontal direction of the pixel electrodes, a plurality of signal lines are arranged, whereas a plurality of data lines are arranged in the vertical direction of the pixel electrodes. At the corner of each pixel electrode, a thin film transistor is formed to apply an electric signal to the pixel. The gate electrode of the thin film transistor is connected to a corresponding one of the signal lines, and the source electrode of the thin film transistor is connected to a corresponding one of data lines. The signal line is also know as the "gate line" and the data line is also known as the "source line". The drain electrode of the thin film transistor is connected to a corresponding one of the pixel electrodes. The end portions of the gate line and source line include a terminal or pad for receiving signals applied externally thereto.

When an electrical signal from an external source is applied to the gate pad, the signal is transmitted to the gate electrodes through the gate line. The source line transmits picture data externally applied to the source pad to the source electrodes. The gate electrode controls whether the picture data from the source electrode should be transmitted to the drain electrode. Therefore, by controlling the signal applied to the gate electrode, transmission of the data signal to the drain electrode is controlled. Accordingly, the data signal can be selectively transmitted to the pixel electrode connected to the drain electrode of the thin film transistor. That is, each thin film transistor functions as a switch for operating a corresponding pixel electrode.

The above described first and second panels are separated by a predetermined distance (know as a cell gap) and a liquid crystal material is injected between the two panels into the cell gap. In the outer surface of each panel, a polarizer is formed for selectively transmitting light from the panel. This completes the formation of a liquid crystal panel which is an important component of the liquid crystal display.

The manufacturing process for the conventional liquid crystal panel is rather complicated and requires many different manufacturing steps. Particularly, the active panel containing TFTs requires many manufacturing steps such that the performance and quality of the completed product depends on how well these complicated manufacturing steps are performed. There is less likelihood of a defect occurring in the completed product if a fewer number of manufacturing steps are required. Further, the active panel contains many important elements which may be subject to defects and affect the performance of the liquid crystal display. Thus, simplifying the manufacturing process for the active panel plays an important role in producing a superior liquid crystal display.

FIG. 1 shows a partial view of an active panel of a conventional liquid crystal display, and FIGS. 2a–2g are cross sectional views for explaining a conventional method of manufacturing an active panel, taken along line II—II in FIG. 1.

As shown in FIGS. 1 and 2a, an aluminum alloy is deposited on a transparent glass substrate 1 and patterned through photolithography to form a gate electrode 11, a gate line 13, a gate pad 15, a source pad 25, and a short circuit line 45 each having a prescribed shape. The gate electrode 11 is positioned at one corner of a corresponding one of the pixel electrodes 41 arranged in a matrix form. The gate line 13 connects a plurality of gate electrodes 11 disposed in one direction. The end portion of the gate line 13 includes a gate pad 15. On the other hand, a source pad 25 is formed at the end portion of the source line 23 which is formed over the gate lines 13. The short circuit line 45 connects all of the gate pads 15 and source pads 25.

Often, however, on the surface of a metal material containing aluminum, spike-like projections known as "hillocks" are formed which cause shorts between neighboring layers. To prevent hillock formation, an anodized oxide layer 19 is formed by anodizing. The short circuit line 45, the aluminum containing gate electrode 11, data line 13, gate pad 15, and source pad 25 are used as an anode during the anodizing. However, the anodized oxide layer 19 does not transmit electricity very well. Therefore, if the anodized oxide layer 19 is formed on the surface of the gate pad 15 and the source pad 25, which receive external electrical signals, the received electrical signals are not properly transmitted. To avoid this problem, the anodized oxide layer 19 is not formed on the surfaces of the gate pad 15 and the source pad 25 as shown in FIG. 2b.

As shown in FIG. 2c, a silicon oxide layer or silicon nitride layer is deposited and patterned to form a gate insulating layer 17 on the substrate 1. On the gate insulating layer 17, an intrinsic semiconductor material such as a pure amorphous silicon and an impurity doped semiconductor material such as an impurity doped amorphous silicon are sequentially deposited and patterned by photolithograph to form a semiconductor layer 33 and impurity doped semiconductor layer 35.

As shown in FIG. 2d, using photolithography, the gate insulating layer 17 is patterned to form a first gate contact hole 51 on the gate pad 15, and a first source contact hole 61 on the source pad 25. These first contact holes 51 and 61 are formed through the gate insulating layer 17 and expose portions of gate pad 15 and source pad 25 which do not include the anodized oxide layer 19 thereon.

As shown in FIG. 2e, a metal material such as a chromium or chromium alloy is deposited and patterned to form a source electrode 21 on one side of the semiconductor layer 33, and a drain electrode 31 on the other side of the semiconductor layer 33. Here, ohmic contacts are formed between the impurity doped semiconductor layer 35 and the source electrode 21 and between the impurity doped semiconductor layer 35 and the drain electrode 31. However, if the impurity doped semiconductor layer 35 is continuously formed between the source electrode 21 and the drain electrode 31, the source and drain electrodes 21 and 31 are always in a state of an electrical connection and cannot function as a switch. Therefore, the portion of the impurity doped semiconductor layer 35 between the source and drain electrodes 21 and 31 should be removed, for example, by lithograph.

As further shown in FIG. 2e, source line 23 is formed and, as shown in FIG. 1, extends in a vertical direction to connect the source electrodes 21. The source line 23 is positioned substantially perpendicular to the gate line 13. At the end portion of the source line 23, a source pad mid-electrode 65 is formed in the first source contact hole 61 for contacting with the source pad 25. Above the gate pad 15, a gate pad mid-electrode 55 is formed in the first gate contract hole 51 for contacting with the gate pad 15.

As shown in FIG. 2f, an insulating material such as silicon oxide or silicon nitride is deposited on the overall surface of the substrate. The protective layer 37 is formed by patterning the insulating material using photolithography, and defines a second gate contact hole 53 near the gate pad 15, a second source contact hole 63 near the source pad 25, and a drain contact hole 71 near the drain electrode 31. The second gate contact hole 53 exposes a portion of the gate pad mid-electrode 55, the second source contact hole 63 exposes a portion of the source pad mid-electrode 65, and the drain contact hole 71 exposes a portion of the drain electrode 31.

The short circuit line 45 for connecting the gate pad 15 and source pad 25 is unnecessary for the final liquid crystal display. Therefore, a portion of the short circuit line 45 which connects both the gate pad 15 and source pad 25 to each other is removed or the entire short circuit line 45 may be eliminated. The removal may be performed by lithography (not shown in the FIG. 1 of 2a–2g).

As shown in FIG. 2g, indium tin oxide (ITO) is deposited and patterned to form a pixel electrode 41, a gate pad connecting terminal 57, and a source pad connecting terminal 67. The pixel electrode 41 is connected with the drain electrode 31 through the drain contact hole 71. The gate pad connecting terminal 57 connects with the gate pad mid-electrode 55 through the second gate contact hole 53. The source pad connecting terminal 67 connects with the source pad mid-electrode 65 through the second source contact hole 63.

The above described manufacturing process calls for an anodizing process and requires at least seven or eight patterning steps using a mask (or masking step). If at least one of the steps can be eliminated, the manufacturing cost and time will be substantially reduced and the production yield will increase. In an effort to reduce the number of masking steps, a method which eliminates one or two of the masking steps and does not use the anodizing process has been developed as described below.

FIG. 3 represents a partial view of a conventional liquid crystal display and FIGS. 4a–4f show cross sectional views for explaining the above simplified method, taken along line IV—IV in FIG. 3.

As shown in FIG. 4a, a metal such as an aluminum or aluminum alloy is deposited on a transparent substrate 1 and patterned by photolithography to form a low resistance gate line 13a and a low resistance gate pad 15a. The low resistance gate lines 13a are disposed between the pixel electrodes 41 formed in an array, and the low resistance gate pad 15a is formed at the end portion of the low resistance gate lines 13a.

As described above, layers using aluminum have a tendency to form hillocks on their surface. Therefore, metal material such as chromium (Cr), molybdenum (Mo), tantalum (Ta), or antimony (Sb) is deposited and patterned to form the gate line 13 and gate pad 15 over the low resistance gate line 13a and the low resistance gate pad 15a, respectively. And, as shown in FIG. 4b, a gate electrode 11 branching out of the gate line 13 is formed. The gate electrode 11 is formed at the corner of a corresponding pixel (see FIG. 3). Although, in FIG. 4b, it is shown that the metal material such as Cr, Mo Ta, or Sb completely covers the aluminum layer, only a portion of the aluminum layer may be covered.

As shown in FIG. 4c, over the substrate 1, an insulating material, such as silicon oxide or silicon nitride is deposited to form an insulating layer 17. On the insulating layer 17, an intrinsic semiconductor material, such as a pure amorphous silicon, and an impurity doped semiconductor material, such as an amorphous silicon with impurities therein, are sequentially deposited and patterned to form a semiconductor layer 33 and an impurity doped semiconductor layer 35, respectively.

As shown in FIG. 4d, a metal material such as a chromium or chromium alloy is deposited and patterned to form a source electrode 21, drain electrode 31, source line 23, and source pad 25. The source electrode 21 is formed to overlap a portion of the gate electrode 11 with the semiconductor and impurity doped semiconductor layers 33 and 35 therebetween. The drain electrode 31 is formed to overlap the other portion of the gate electrode 11 with the semiconductor and impurity semiconductor layers 33 and 35 therebetween. Here, ohmic contacts are formed between the source electrode 21 and impurity doped semiconductor layer 35 and between the drain electrode 31 and impurity doped semiconductor layer 35. Using the source electrode 21 and drain electrode 31 as masks, the impurity doped semiconductor layer 35 is selectively etched to remove the impurity doped semiconductor layer 35 between the source electrode 21 and drain electrode 31. As shown in FIGS. 3 and 4d, the source line 23 is arranged vertically and connected with the source electrode 21, and the source pad 25 is formed at the end portion of the source line 23.

As shown in FIG. 4e, an insulating material such as silicon oxide or silicon nitride is deposited over the substrate 1 having the source electrode 21 and drain electrode 31 to form a protective layer 37. The protective layer 37 and a portion of the insulating film 17 are patterned to form a drain contact hole 71, gate pad contact hole 59, and a source pad contact hole 69. The drain contact hole 71 exposes a portion of the drain electrode 31, the gate pad contact hole 59 exposes the gate pad 15, and the source pad contact hole 69 exposes the source pad 25.

As shown in FIG. 4f, on the protective layer 37 a transparent conductive material such as ITO (indium-tin-oxide) is deposited and patterned to form a pixel electrode 41, a gate pad connecting terminals 57, and a source pad connecting terminal 67. The pixel electrode 41 is connected with the drain electrode 31 through the drain contact hole 71. The gate pad connecting terminal 57 is connected with the gate pad 15 through the gate pad contact hole 59. The source pad connecting terminal 67 is connected with the source pad 25 through the source pad contact hole 69.

As described above, the active panel of conventional liquid displays are formed with or without using anodizing. However, both of these methods have problems with respect to the gate pad portion. To better explain these problems of the conventional methods, reference will be made to FIGS. 5a–5b and 6 for the method using anodizing and the method without anodizing, respectively. FIGS. 5a–5b show a cross sectional view taken along line V—V in FIG. 1, and FIG. 6 shows a cross sectional view taken along line VI—VI in FIG. 3.

In the method using anodizing, the anodized oxide layer is composed of a material highly resistant to chemical etching so that it does not react to an etchant used in forming the active panel. Referring to FIG. 5a, in the process of forming the gate insulating layer 17, the semiconductor layer 33, the impurity doped semiconductor layer 35 and the gate pad contact hole 51, the anodized oxide layer 19 formed near the outer edge of the gate pad 15 prevents the etchant near the steps, formed by the gate insulating layer 17 over the gate pad 15, from seeping into the gate pad 15. Further thereafter, as shown in FIG. 5b, when forming the gate pad mid-electrode 55, the gate pad mid-electrode 55 covers the area surrounding the gate pad 15 and protects the gate pad 15. However, using the anodizing method requires many masking steps which increase the number of errors occurring from failing to exactly position the masks.

In the second method, which does not use anodizing, the number of masking steps, errors arising therefrom and the manufacturing time are all reduced as compared to the method using the anodizing. However, in forming the semiconductor and impurity doped semiconductor layer or the source and drain electrodes, the etchant undercuts the gate pad 15 through the steps of the gate insulating layer 17 covering the gate pad 15, causing defects in the gate pad 15 (see FIG. 6).

SUMMARY OF THE INVENTION

The present invention is directed to a liquid crystal display and a method of manufacturing the same that substantially obviates one or more of the problems due to limitations and disadvantages of the related art.

An object of the present invention is to provide a method of manufacturing a liquid crystal display which protects a gate pad from penetration of an etchant and a liquid crystal display formed by the same method.

Another object of the present invention is to provide a liquid crystal display and a method of manufacturing the same which protects the gate pad portion from etchant penetration and at the same time lowers contact resistance of the gate pad portion.

These and other objects are achieved by providing a method of manufacturing a liquid crystal display, comprising the steps of: forming a gate line, at least one gate electrode branching out of the gate line, and a gate pad disposed at an end portion of said gate line on a substrate, said gate pad having a periphery; forming a gate insulating layer over said substrate and on said gate line, said gate electrode, and said gate pad; and forming a first dummy gate pad on said gate insulating layer over at least a portion of said periphery of said gate pad;

These and other objects are further achieved by providing a liquid crystal display, comprising: a substrate; a gate line formed on said substrate; at least one gate electrode branching out of said gate line on said substrate; a gate pad disposed at an end portion of said gate line on said substrate, said gate pad having a periphery; a gate insulating layer formed over said substrate and on said gate line, said gate electrode, and said gate pad; and a first dummy gate pad formed on said gate insulating layer over at least a portion of said periphery of said gate pad.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE ATTACHED DRAWINGS

The present invention will become more fully understood from the detailed description given hereinbelow and the accompanying drawings which are given by way of illustration only, and thus are not limitative of the present invention, and wherein:

FIGS. 11a–11c show different gate pad portions of a liquid crystal display according to the embodiments of the present invention.

DETAILED DESCRIPTION OF THE PREFERRED EMBODIMENTS

In the present invention, in order to simplify the manufacturing process for producing a liquid crystal display, anodizing is not utilized. At the same time, in order to protect the gate pad or source pad from etchant penetration, the following methods are utilized.

On a substrate, a first conductive material containing aluminum is deposited and patterned to form a gate line, gate electrode, and a gate pad. Using a first insulating material, a gate insulating layer is formed covering the gate line, gate electrode, and gate pad. On the gate insulating layer, an intrinsic semiconductor material and a semiconductor material containing impurities are sequentially deposited and patterned to form a semiconductor layer and an impurity doped semiconductor layer, respectively, for covering the gate electrode. Here a dummy semiconductor layer and a dummy impurity doped semiconductor layer are formed into a dummy gate pad over an edge portion or periphery of the gate pad. Using a second conductive layer containing chromium, a source electrode, a drain electrode, a source line, and a source pad are formed thereon. In addition to the dummy semiconductor gate pad or alternatively thereto, a dummy gate pad made of a second conductive layer is formed surrounding the outer edge portion or periphery of the gate pad. On the source electrode, drain electrode, source line, source pad and dummy gate pad, a second insulating layer is formed as a protective layer. In the protective layer, a drain contact hole, a gate pad contact hole, and a source pad contact hole are formed. On the protective layer, a transparent conductive material is deposited and patterned to form a pixel electrode for connecting with the drain electrode through the drain contact hole, a gate pad connecting terminal for connecting with the gate pad through the gate pad contact hole, and a source pad connecting terminal for connecting with the source pad through the source pad contact hole. The dummy semiconductor gate pad and/or the dummy conductive gate pad serve as an etching protective layer with respect to the gate pad.

Using the below examples, the present invention will be described in more detail.

Figure 1:
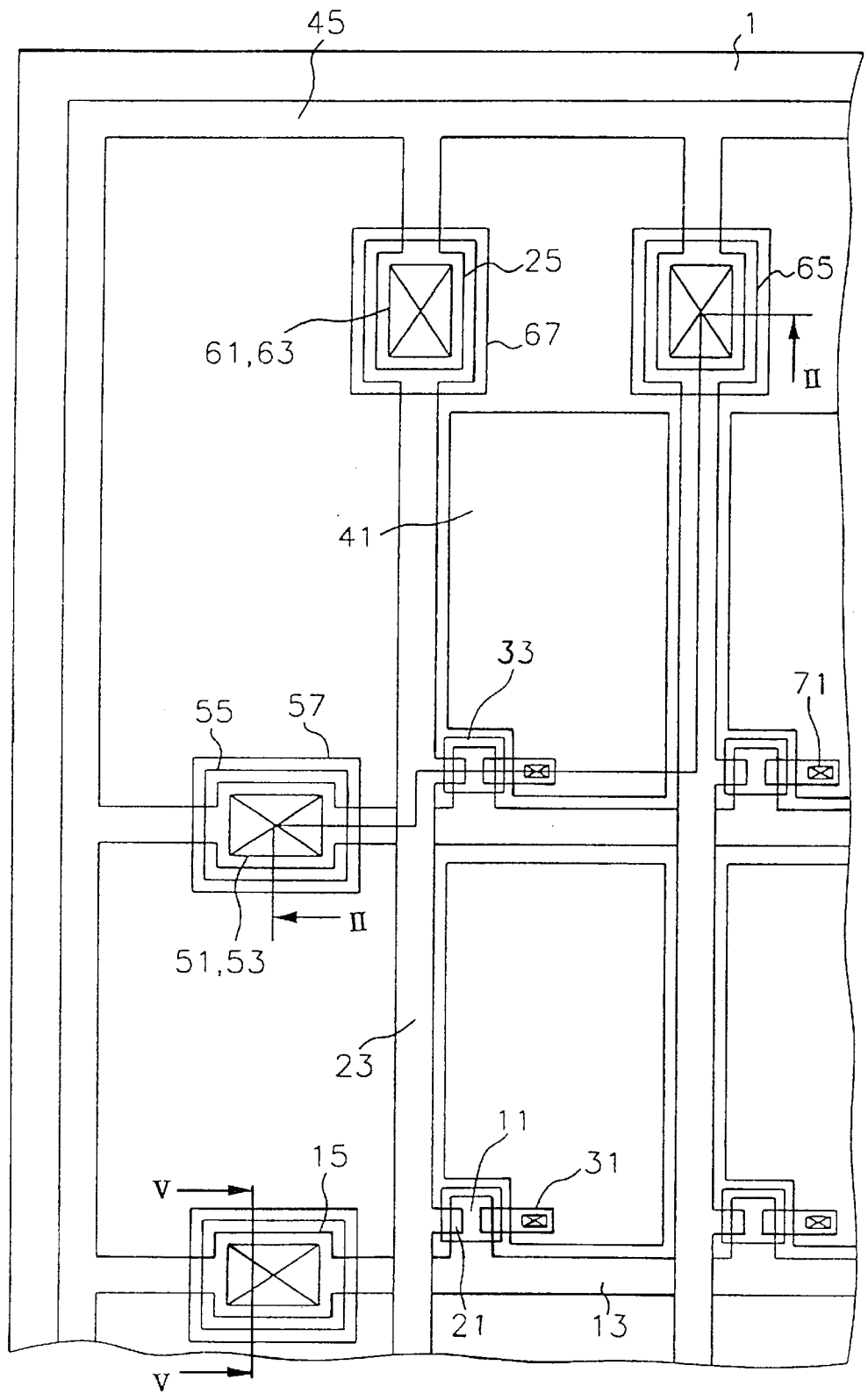
FIG. 1 shows a partial view of a conventional liquid crystal display formed by anodizing.
Figure 2A:
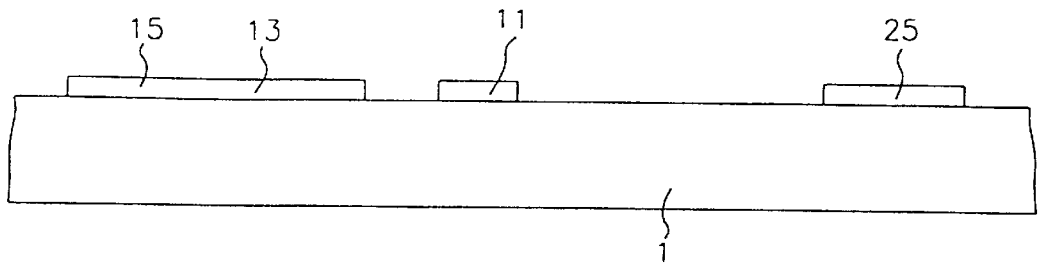
FIGS. 2a–2g show cross sectional views for explaining a conventional method of forming a liquid crystal display using anodizing, taken along line II—II of FIG. 1.
Figure 2B:
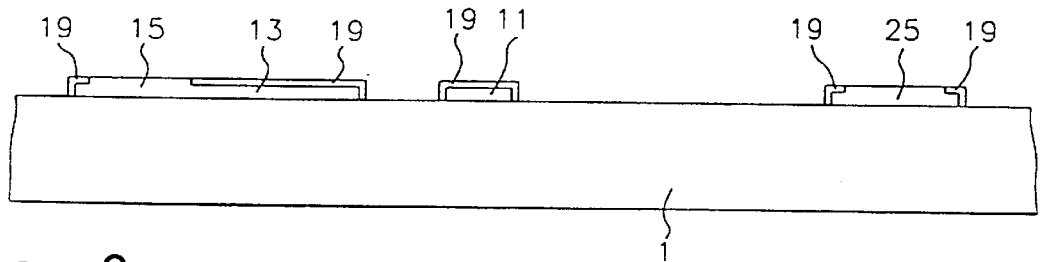
Figure 2C:
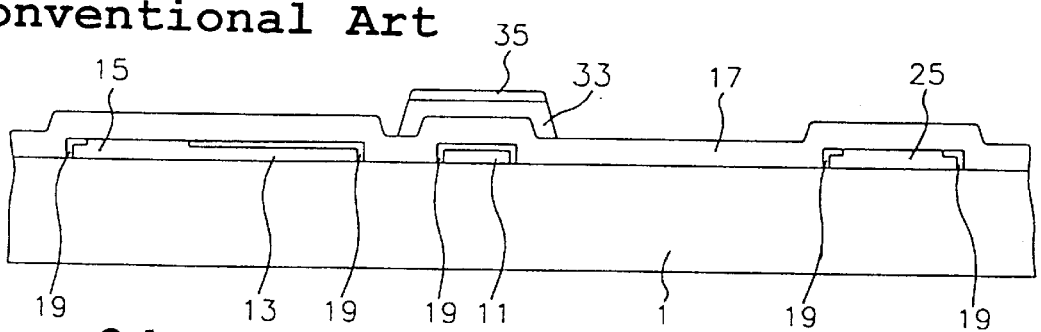
Figure 2D:
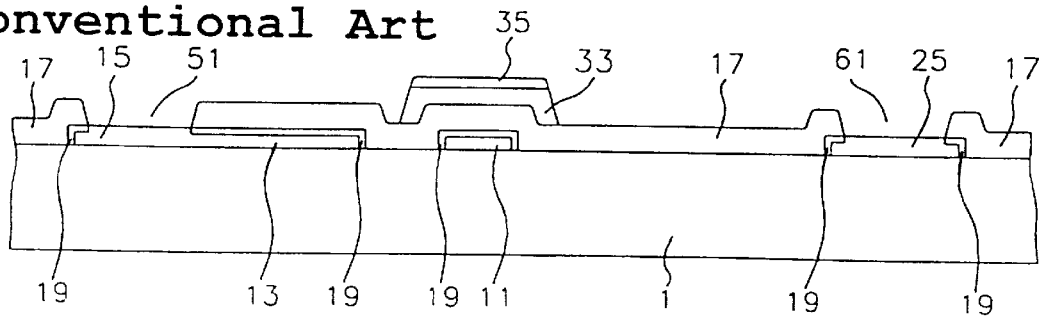
Figure 2E:
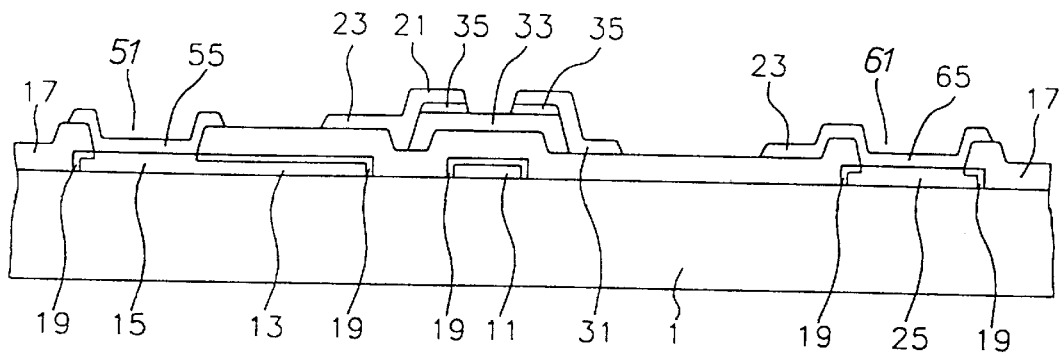
Figure 2F:
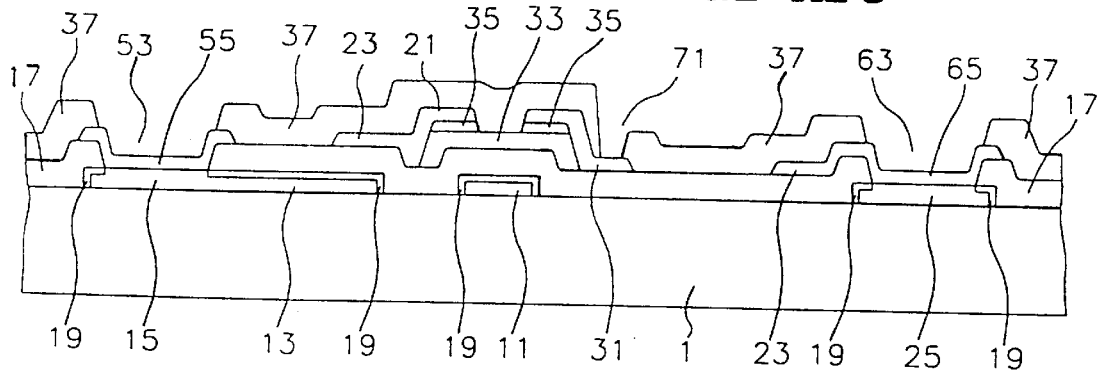
Figure 2G:
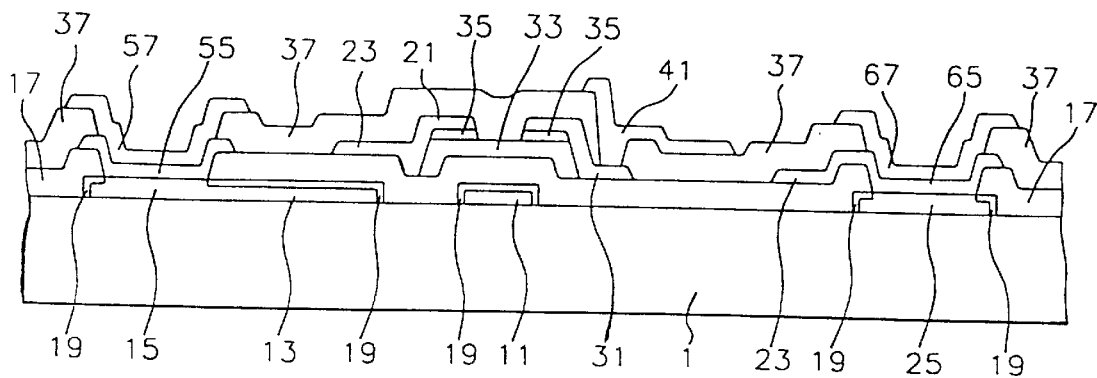
Figure 3:
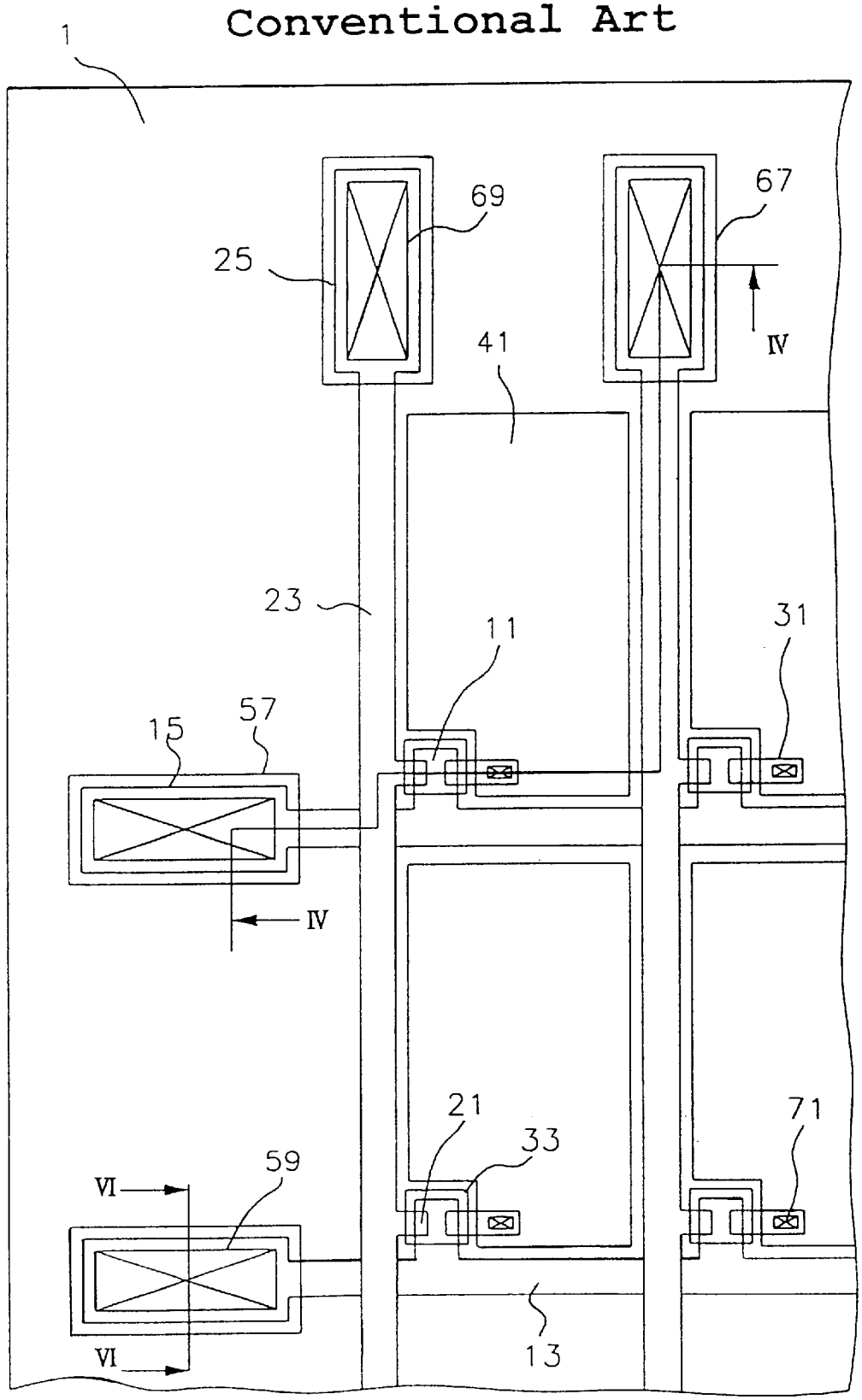
FIG. 3 shows a conventional liquid crystal display formed without using anodizing.
Figure 4A:
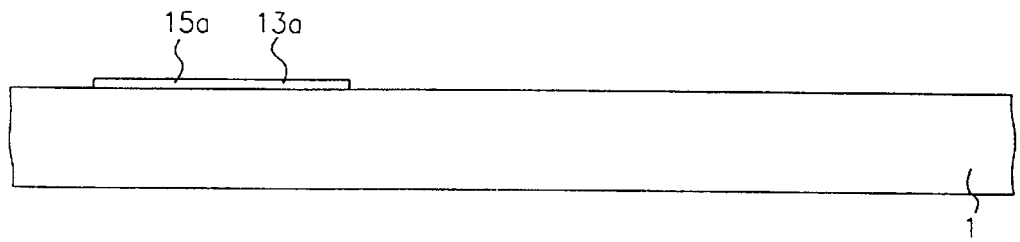
FIGS. 4a–4f show cross sectional views for explaining a conventional method of forming a liquid crystal display without using anodizing, taken along line IV—IV of FIG. 3.
Figure 4B:
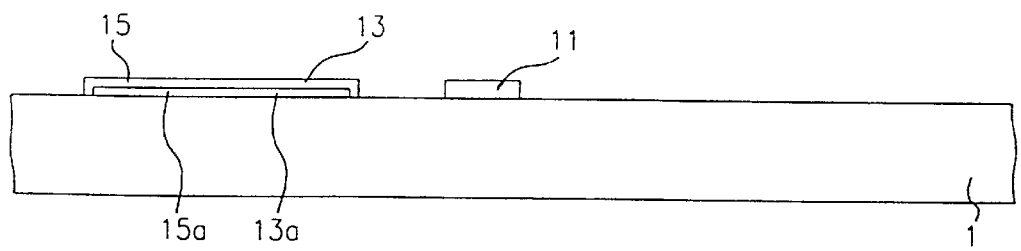
Figure 4C:
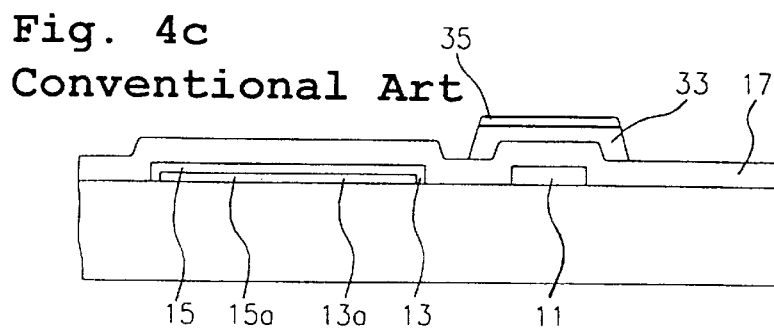
Figure 4D:
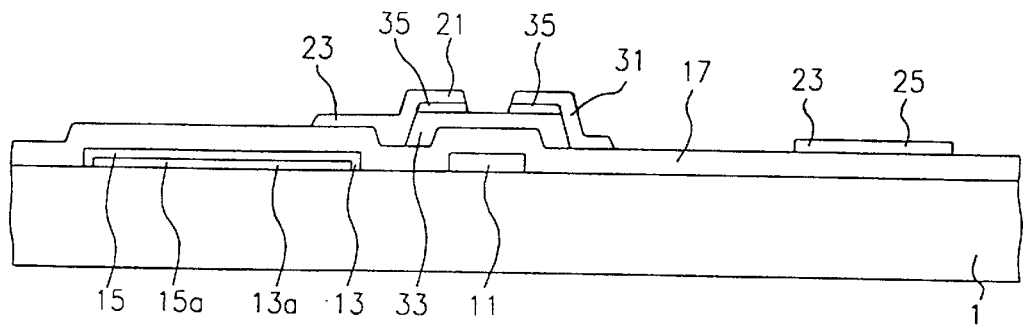
Figure 4E:
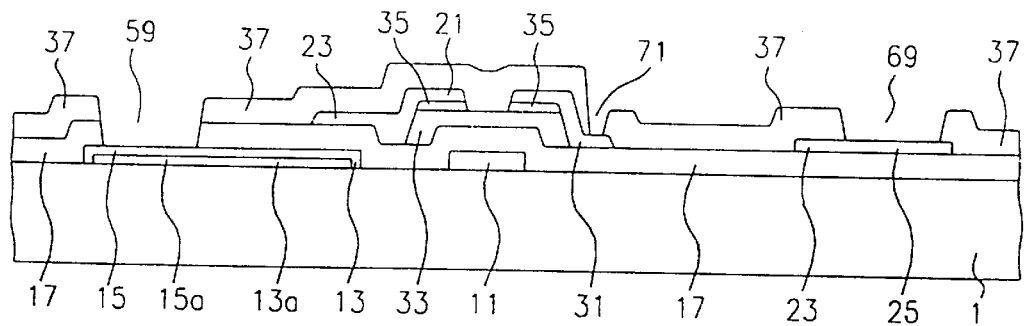
Figure 4F:
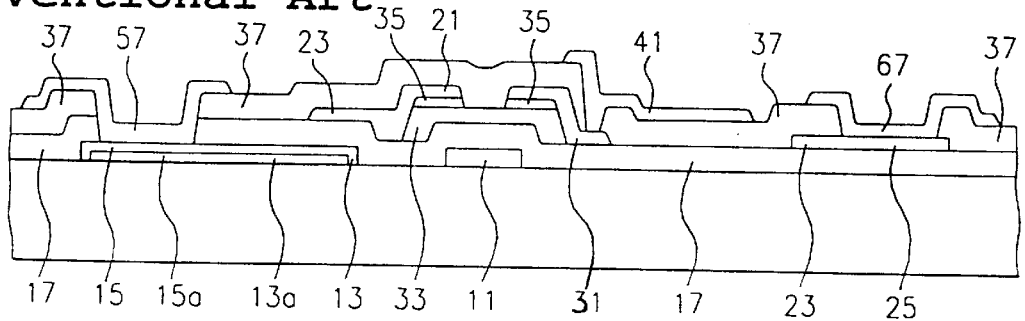
Figure 5A:
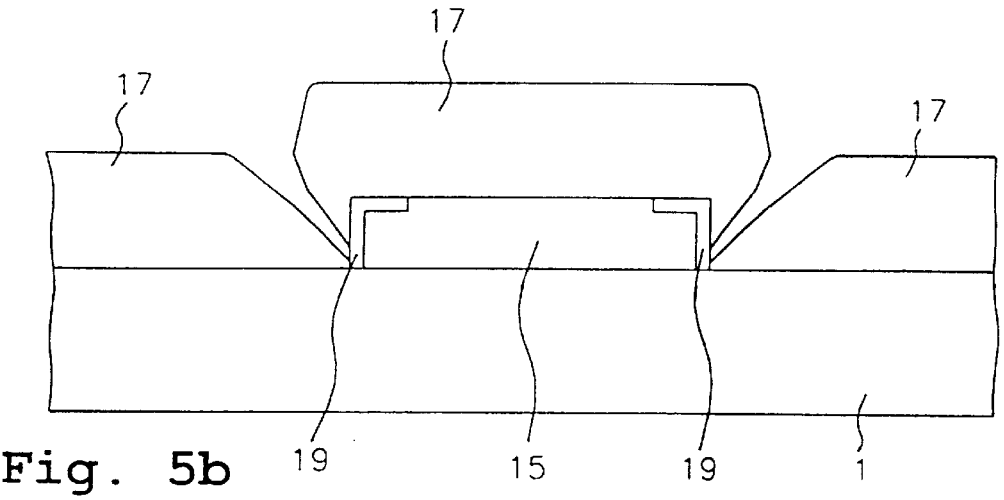
FIGS. 5a and 5b show cross sectional views taken along line V—V of FIG. 1 for explaining a situation when the etchant penetrates through the gate insulating layer and its step portions.
Figure 5B:
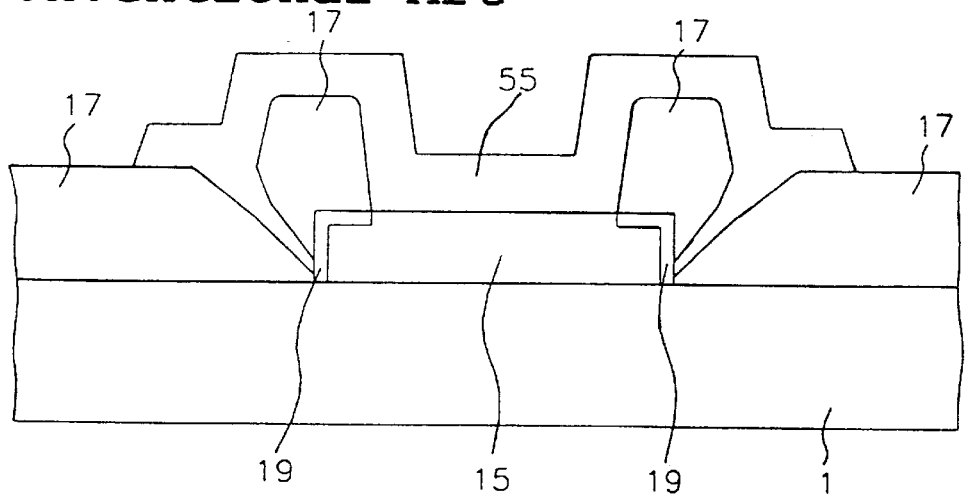
Figure 6:
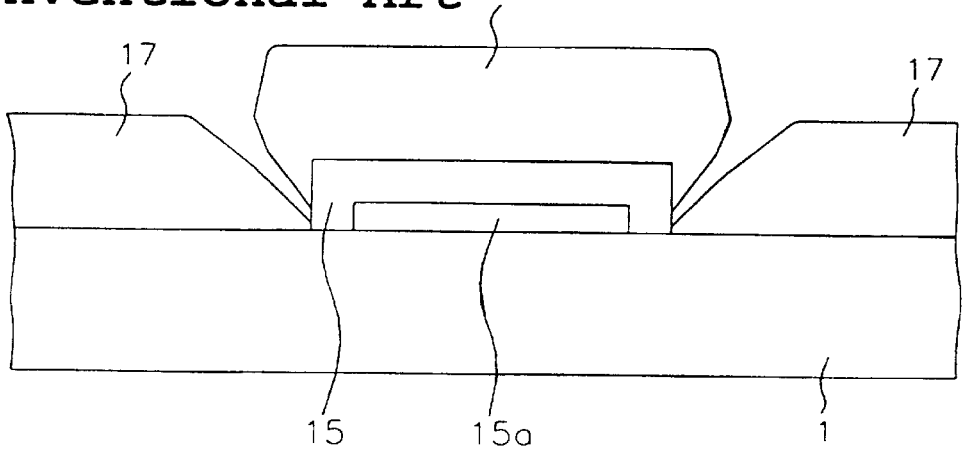
FIG. 6 shows a cross sectional view taken along line VI—VI of FIG. 3 for explaining a situation when etchant penetrates through the gate insulating layer and its step portions.
Figure 7:
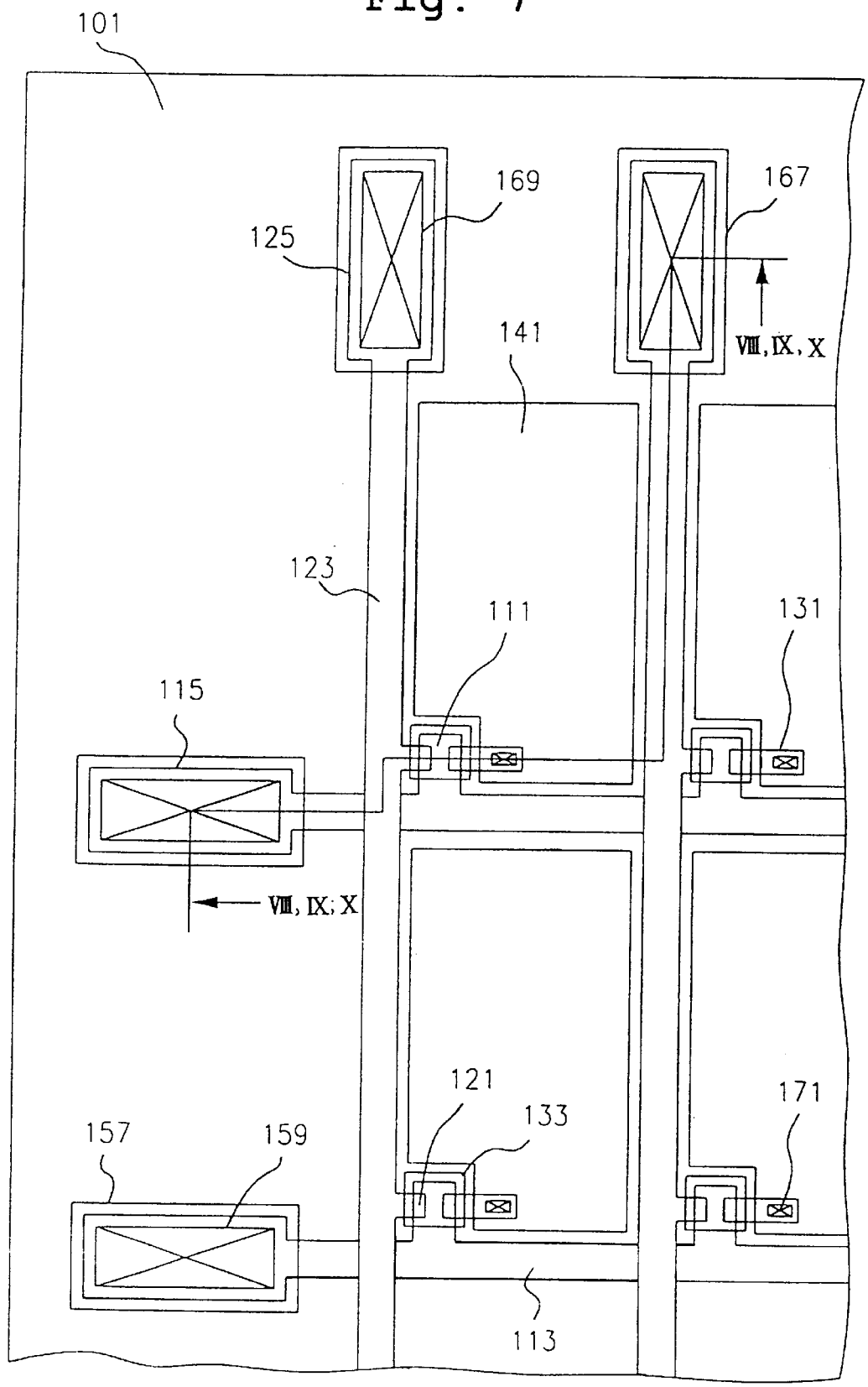
FIG. 7 shows a partial view of a liquid crystal display according to the embodiments of the present invention.

FIG. 7 shows a partial view of a liquid crystal display according to the embodiments of the present invention, and FIGS. 8a–8f show cross sectional views taken along line VIII—VIII of FIG. 7. In this example, the process for forming a dummy gate pad using a semiconductor material is described.

Figure 8A:
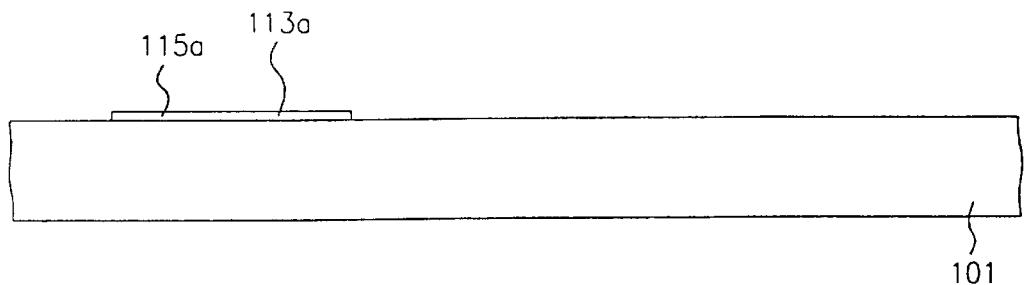
FIGS. 8a–8f show cross sectional views for explaining one embodiment of a method of manufacturing a liquid crystal display according to the present invention, taken along line VIII—VIII of FIG. 7.

As shown in FIG. 8a, on a transparent glass substrate 101, aluminum is deposited and patterned by photolithography to form a low resistance gate line 113a and low resistance gate pad 115a. The low resistance gate line 113a is positioned where the gate line 113 will be formed, whereas the low resistance gate pad 115a is positioned where the gate pad 115 is to be formed.

Figure 8B:
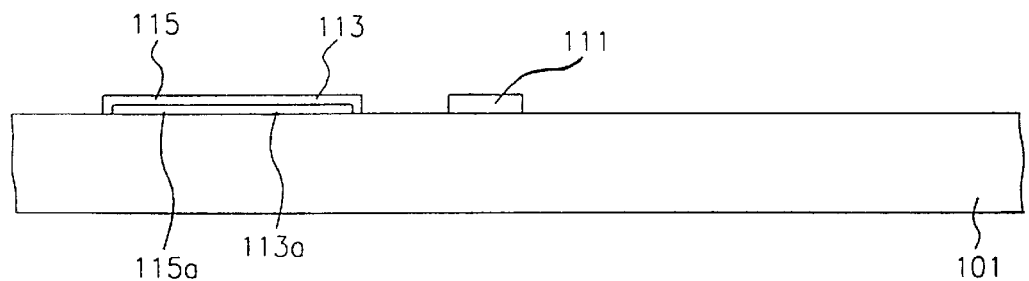

As shown in FIG. 8b, on the low resistance gate line 113a and the low resistance gate pad 115a, a metal such as chromium (Cr), molybdenum (Mo), tantalum (Ta), or antimony (Sb) is deposited and patterned to form a gate electrode 111, a gate line 113 and a gate pad 115. The gate electrode 111 is arranged at one corner of a corresponding pixel electrode 141. The gate line 113 is arranged in one direction for connecting a plurality of gate electrodes 111 and covers the low resistance gate line 113a. Here, the gate line 113 may be formed to completely cover the low resistance gate line 113a or to partially cover the low resistance gate line 113a. The gate pad 115 is formed at the end portion of the gate line 113 and covers the low resistance gate pad 115a in a manner similar to the way the gate line 113 covers the low resistance gate line 113a.

Figure 8C:
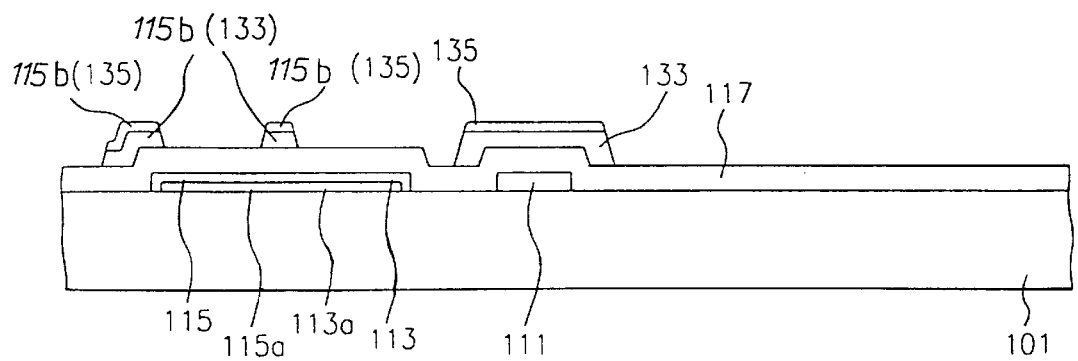

As shown in FIG. 8c, a gate insulating layer 117 is formed by depositing silicon oxide or silicon nitride over the substrate 101. On the gate insulating layer 117, an intrinsic semiconductor material, such as a pure amorphous silicon, and an impurity doped semiconductor material, such as an amorphous silicon with impurities, are sequentially deposited and patterned to form a semiconductor layer 133 and an impurity doped semiconductor layer 135 covering the gate electrode 111. Surrounding the periphery of the gate pad 115, where the steps of the gate insulating layer 117 are positioned, a dummy gate pad 115b, made of the semiconductor layer 133 and the impurity doped semiconductor layer 135, is formed. The dummy gate pad 115b serves as an etching protective layer with respect to the gate pad 115.

Figure 8D:
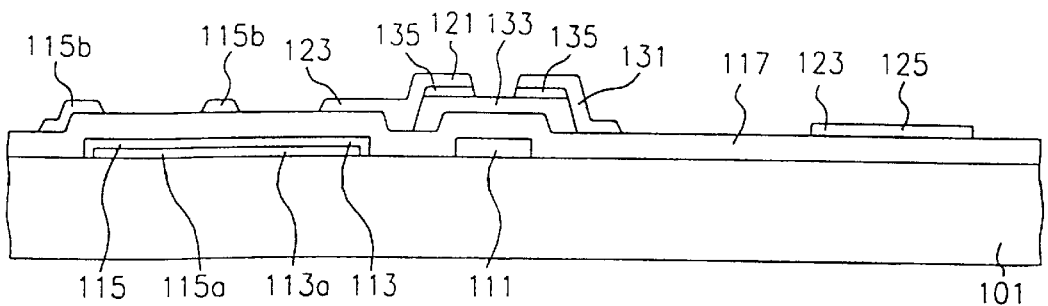

As shown in FIG. 8d, chromium or chromium alloy is deposited over the substrate including the semiconductor layer 133 and the impurity doped semiconductor layer 135, and patterned to form a source electrode 121, a drain electrode 131, a source line 123 and a source pad 125. The source electrode 121 is formed to overlap one side of the gate electrode 111, and the drain electrode 131 is formed to overlap the other side of the gate electrode 111, with the semiconductor layer 133 and the impurity doped semiconductor layer 135 therebetween, respectively. Between the source electrode 121 and the impurity doped semiconductor layer 135 and between the drain electrode 131 and the impurity doped semiconductor layer 135, ohmic contacts are formed. Using the source electrode 121 and the drain electrode 131 as masks, the impurity doped semiconductor layer 135 is selectively etched to completely remove the portion of the impurity doped semiconductor layer 135 formed between the source electrode 121 and the drain electrode 131. Because this etching process also removes the impurity doped semiconductor material used to form the dummy gate pad 115b surrounding the periphery of the gate pad 115, the dummy gate pad 115b contains only the semiconductor layer 133 made of an intrinsic semiconductor material. As shown in FIG. 7, the source line 123 extends in a vertical direction and connects the source electrodes 121. The source pad 125 is formed at the end portion of the source line 123.

Figure 8E:
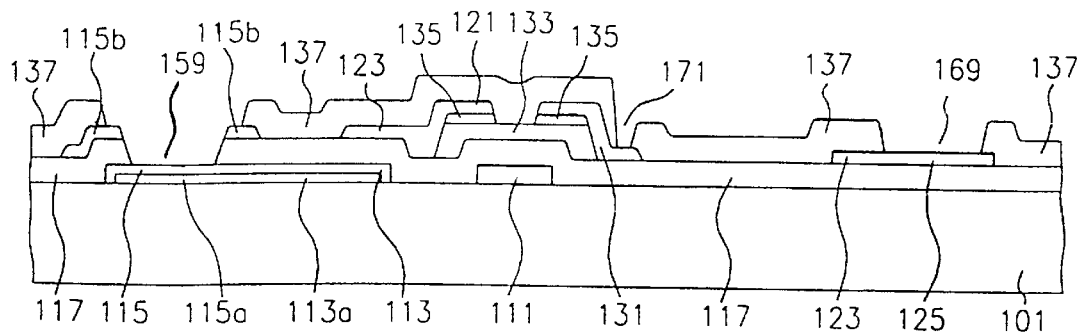

As shown in FIG. 8e, an insulating material such as silicon oxide or silicon nitride is deposited and patterned to form a protective layer 137 over the substrate 101 including the source electrode 121. The protective layer 137 includes a drain contact hole 171 formed over the drain electrode 131, and a gate pad contact hole 159 over the gate pad 115. Through the gate pad contact hole 159, a portion of the dummy gate pad 115b is exposed. Using the dummy gate pad 115b as a mask, continuous etching is performed to remove the portion of the gate insulating layer 117 covering the gate pad 115 and to expose a portion of the gate pad 115 through the gate pad contact hole 159. A source pad contact hole 169 is also formed over the source pad 125.

By forming the gate insulating layer 117 and the protective layer 137 from the same material, such as silicon nitride, selective etching of only these layers can be performed during the continuous etching process, wherein the dummy gate pad 115b serves as a mask during this continuous etching process. Furthermore, the protective layer 137, the dummy gate pad 115b, and the gate insulating layer 117 define a stepped sidewall structure for the gate pad contact hole 159.

Figure 8F:
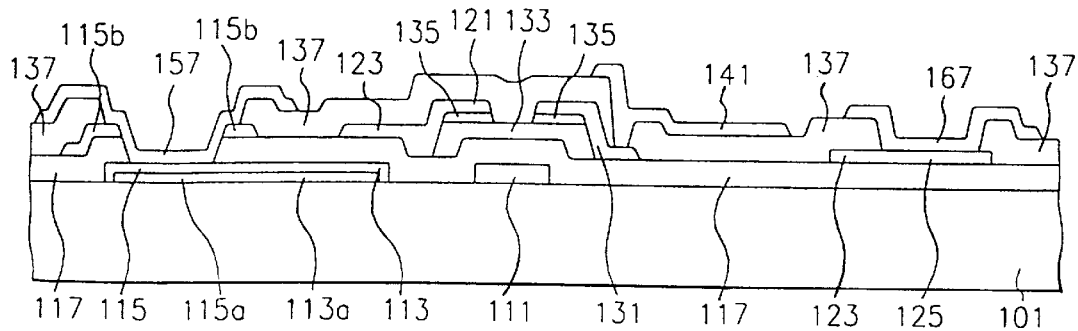

As shown in FIG. 8f, a transparent conductive material such as ITO (indium tin oxide) is deposited on the protective layer 137 and patterned to form a pixel electrode 141, a gate pad connecting terminal 157, and a source pad connecting terminal 167. The pixel electrode 141 is connected with the drain electrode 131 through the drain contact hole 171. The gate pad connecting terminal 157 is connected with the dummy gate pad 115b and the gate pad 115 through the gate pad contact hole 159. The source pad connecting terminal 167 is connected with the source pad 125 through the source pad contact hole 169.

In this example, the semiconductor layer 133 containing an intrinsic semiconductor material is utilized to surround the steps of the gate insulating layer 117 (i.e. cover the periphery of the gate pad 115). As a result, the semiconductor material prevents an etchant from penetrating through the weak portions (at or near the steps) of the gate insulating layer 117.

FIGS. 9a–9f show cross-sectional views taken along line IX—IX of FIG. 7 for illustrating another embodiment of a method of manufacturing a liquid crystal display device according to the present invention. In this example, a process of forming a dummy gate pad using a metal material such as chromium, which is also used to form source and drain electrodes, will be described.

Figure 9A:
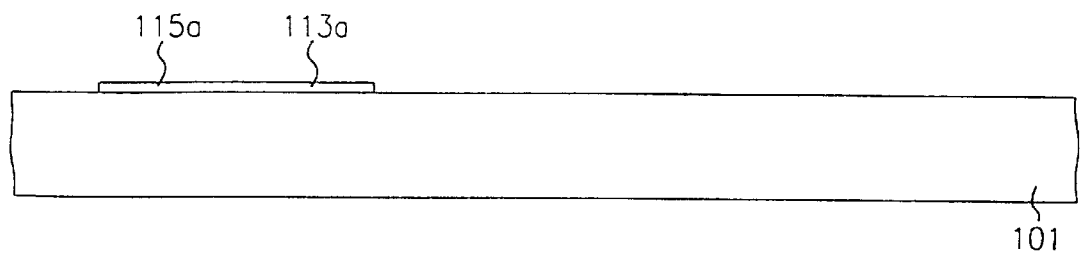
FIGS. 9a–9f are cross sectional views taken along line IX—IX of FIG. 7 for explaining another embodiment of a method of manufacturing a liquid crystal display according to the present invention.

As shown in FIG. 9a, on a transparent glass substrate 101, aluminum is deposited and patterned by photolithography to form a low resistance gate line 113a and a low resistance gate pad 115a. The low resistance gate line 113a is positioned where the gate line 113 is to be formed. The low resistance gate pad 115a is positioned where the gate pad 115 will be formed.

Figure 9B:
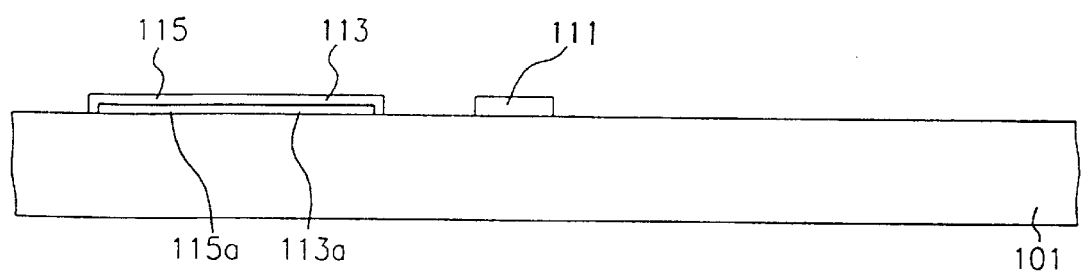

As shown in FIG. 9b, a metal such as chromium (Cr), molybdenum (Mo), tantalum (Ta), or antimony (Sb) is deposited on the low resistance gate line 113a and low resistance gate pad 115a, and patterned to form a gate electrode 111, a gate line 113 and a gate pad 115. A plurality of gate electrodes 111 are arranged such that each gate electrode 111 is formed at one corner of a corresponding pixel in an array. The gate line 113 extends in a horizontal direction to connect a plurality of gate electrodes 111 and covers the low resistance gate line 113a or partially cover the low resistance gate line 113a. Here, the gate line 113 may completely cover the low resistance gate line 113a. At the end portion of the gate line 113a, the gate pad 115 is formed and covers the low resistance gate pad 115a in a manner similar to the way the gate line 113 covers the low resistance gate line 113a.

Figure 9C:
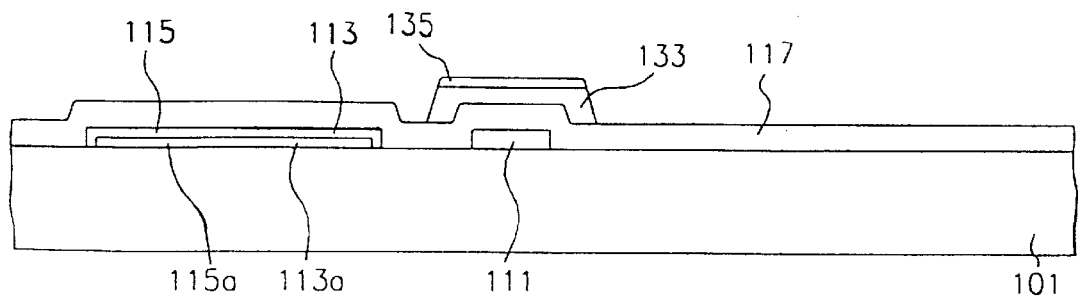

As shown in FIG. 9c, silicon oxide or silicon nitride is deposited over the substrate 101 including the gate electrode 111, the gate line 113 and the gate pad 115 to form a gate insulating layer 117. On the gate insulating layer 117, an intrinsic semiconductor material, such as a pure amorphous silicon, and an impurity doped semiconductor material, such as an amorphous silicon with impurities therein, are sequentially deposited and patterned to form a semiconductor layer 133 and an impurity doped semiconductor layer 135 covering the gate electrode 111.

Figure 9D:
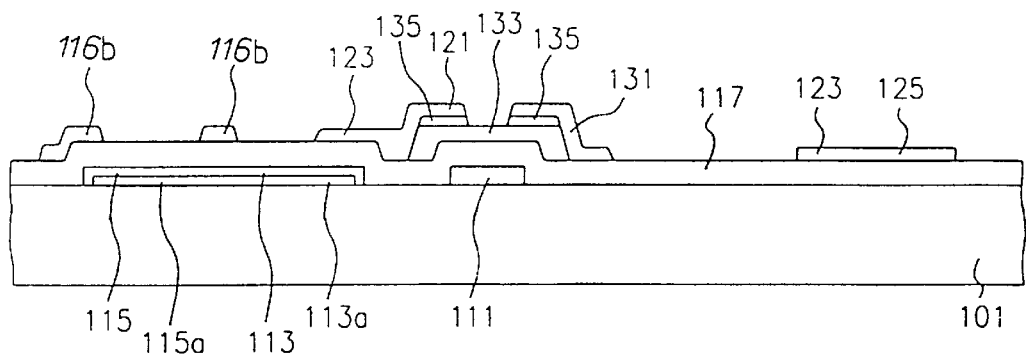

As shown in FIG. 9d, chromium or chromium alloy is deposited over the substrate 101, and patterned to form a source electrode 121, a drain electrode 131, a source line 123, a source pad 125, and a dummy gate pad 116b. The source electrode 121 is formed to overlap one side of the gate electrode 111, and the drain electrode 131 is formed to overlap the other side of the gate electrode 111, with the semiconductor layer 133 and impurity doped semiconductor layer 135 therebetween. Ohmic contacts are formed between the source electrode 121 and the impurity doped semiconductor layer 135, and between the drain electrode 131 and the impurity doped semiconductor layer 135. Using the source electrode 121 and drain electrode 131 as masks, the impurity doped semiconductor layer 135 is selectively etched to completely remove the portion of impurity doped semiconductor layer 135 formed between the source electrode 121 and the drain electrode 131. As shown in FIG. 7, the source line 123 extends in one direction and connects with a plurality of source electrodes 121. The source pad 125 is formed at the end of source line 123.

The dummy gate pad 116b covers the steps of the gate insulating layer 117 and surrounds the periphery of the gate pad 115. The dummy gate pad 116b serves as an etching protective layer with respect to the gate pad 115.

Figure 9E:
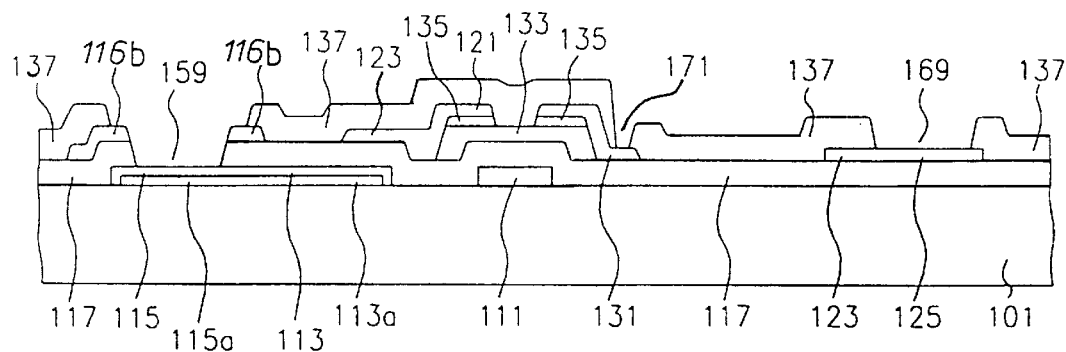

As shown in FIG. 9e, an insulating material such as silicon oxide or silicon nitride is deposited over the substrate 101, including the source electrode 121, to form a protective layer 137. The protective layer 137 is patterned to form a drain contact hole 171 on the drain electrode 131, and to form a gate pad contact hole 159 on the gate pad 115 which exposes a predetermined portion of the dummy gate pad 116b. Using the dummy gate pad 116b as a mask, a continuous etching process is performed to etch the gate insulating layer 117 covering the gate pad 115 and expose a portion of the gate pad 115 through the gate pad contact hole 159. Then a source pad contact hole 169 is formed near the source pad 125.

By forming the gate insulating layer 117 and the protective layer 137 from the same material, such as silicon nitride, selective etching of only these layers can be performed during the continuous etching process, wherein the dummy gate pad 116b serves as a mask during this continuous etching process. Furthermore, the protective layer 137, the dummy gate pad 116b, and the gate insulating layer 117 define a stepped sidewall structure for the gate pad contact hole 159.

Figure 9F:
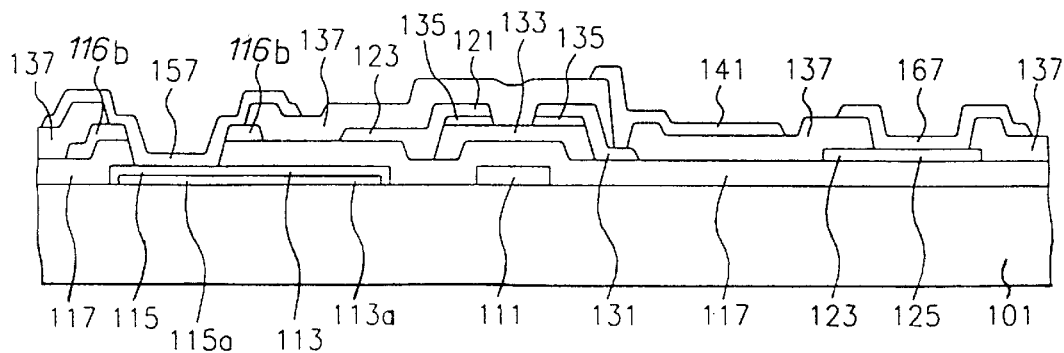

As shown in FIG. 9f, a transparent conductive material, such as ITO (indium tin oxide), is deposited on the protective layer 137 and patterned to form a pixel electrode 141, a gate pad connecting terminal 157, and a source pad connecting terminal 167. The pixel electrode 141 is connected with the drain electrode 131 through the drain contact hole 171. The gate pad connecting terminal 157 is connected with the dummy gate pad 116b and the gate pad 115 through the gate pad contact hole 159. The source pad connecting terminal 167 is connected with the source pad 125 through the source pad contact hole 169.

In this example, a metal containing chromium, which is used to form the source electrode 121, is used to surround the steps of the gate insulating layer 117 covering the gate pad 115. As a result, an etchant is prevented from penetrating through the weak portions (at or near the steps) of the gate insulating layer 117. Furthermore, since the dummy gate pad 116b is electrically connected with the gate pad 115 and gate pad connecting terminal 157, the constant resistance of the gate pad 115 is lowered.

FIGS. 10a–10f show cross-sectional views taken along line X—X of FIG. 7 for illustrating a method of manufacturing a liquid crystal display in accordance with another embodiment of the present invention. In this example, a process for forming a dummy gate pad using a semiconductor material and a metal, which forms the source electrode and contains chromium, is described.

Figure 10A:
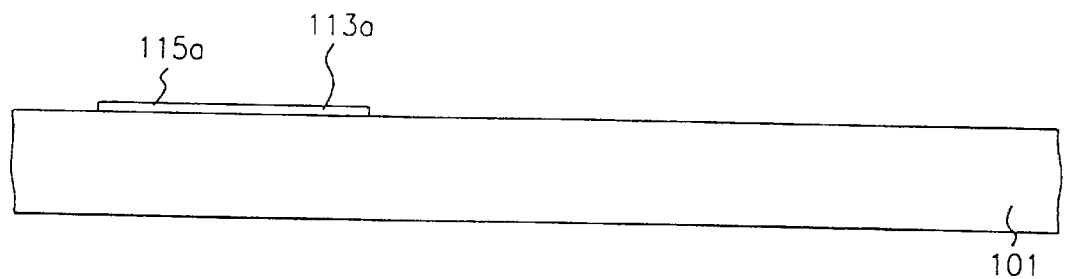
FIGS. 10a–10f show cross sectional views taken along line X—X of FIG. 7 for explaining another embodiment of a method of manufacturing a liquid crystal display according to the present invention.

As shown in FIG. 10a, aluminum is deposited on a transparent glass substrate 101, and patterned by photolithography to form a low resistance gate line 113a and a low resistance gate pad 115a. The low resistance gate line 113a is positioned where a gate line 113 will be formed. The low resistance gate pad 115a is formed where a gate pad 115 will be formed.

Figure 10B:
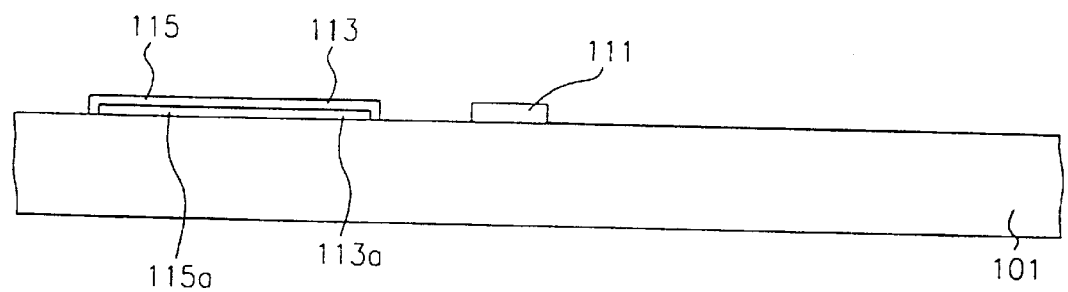

As shown in FIG. 10b, a metal such as chromium (Cr) molybdenum (Mo), tantalum (Ta) or antimony (Sb) is deposited over the substrate 101. This metal is patterned to form a gate electrode 111, a gate line 113 and a gate pad 115. As shown in FIG. 7, the gate electrodes 111 are arranged such that each gate electrode 111 is formed at one corner of a corresponding pixel in an array. The gate line 113 extends in a horizontal direction to connect the gate electrodes 111 and to cover the low resistance gate line 113a. The gate line 113 can completely cover the low resistance gate line 113a or partially cover the low resistance gate line 113a. The gate pad 115 is formed at the end portion of the gate line 113 and covers the low resistance gate pad 115a in a manner similar to the way the gate line 113 covers the low resistance gate line 113a.

Figure 10C:
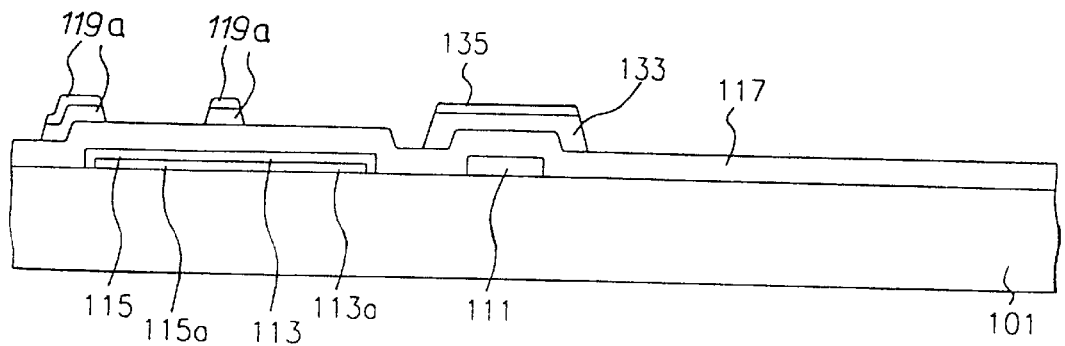

As shown in FIG. 10c, silicon oxide or silicon nitride is deposited over the substrate 101 to form a gate insulating layer 117. On the gate insulating layer 117, an intrinsic semiconductor material, such as a pure amorphous silicon, and an impurity doped semiconductor material, such as an amorphous silicon with impurities, are sequentially deposited and patterned to form a semiconductor layer 133 and an impurity doped semiconductor layer 135, respectively. A first dummy gate pad 119a is also formed surrounding the gate pad 115 near the steps of the gate insulating layer 117 covering the gate pad 115. The first dummy gate pad 119a is composed of the semiconductor layer 133 and the impurity doped semiconductor layer 135.

Figure 10D:
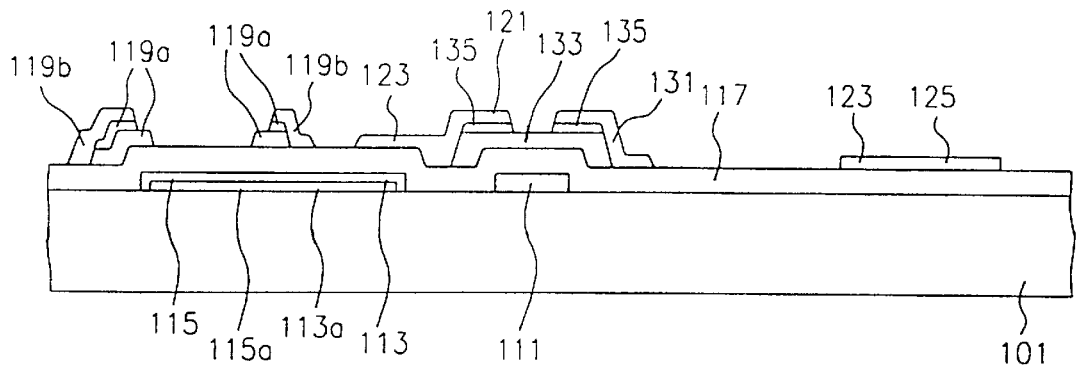

As shown in FIG. 10d, chromium or chromium alloy is deposited over the substrate 101 including the semiconductor layer 133 and the impurity doped semiconductor layer 135, and is patterned to form a source electrode 121, a drain electrode 131, a source line 123, a source pad 125, and a second dummy gate pad 119b. The source electrode 121 is formed to overlap on one side of the gate electrode 111, whereas the drain electrode 131 is disposed to overlap the other side of the gate electrode 111, with the semiconductor layer 133 and the impurity doped semiconductor 135 therebetween. An ohmic contact is formed between the source electrode 121 and impurity doped semiconductor layer 135, and between the drain electrode 131 and impurity doped semiconductor layer 135. Using the source electrode 121 and drain electrode 131 as a mask, a portion of the impurity doped semiconductor layer 135 is etched to completely remove the impurity doped semiconductor layer 135 between the source and drain electrodes 121 and 131. At the same time, the impurity doped semiconductor material used to form the first dummy gate pad 119a surrounding the gate pad 115 is removed using the second dummy gate pad 119b as a mask. As shown in FIG. 7, the source line 123 extends in vertical direction to connect the source electrodes 121. At the end of the source line 123, a source pad 125 is formed. The second dummy gate pad 119b covers the first dummy gate pad 119a composed of a semiconductor material. As a result, in this example, a dummy gate pad having a double structure composed of a semiconductor material and a metal, for example, chromium, is formed. The first and second dummy gate pads 119a and 119b serve as an etching protective layer with respect to the gate pad 115.

Figure 10E:
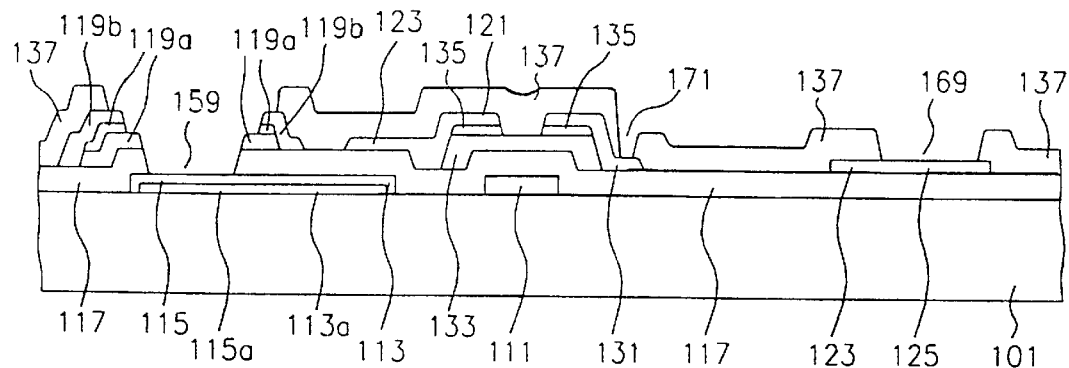

As shown in FIG. 10e, an insulating material such as silicon oxide or silicon nitride is deposited over the substrate 101 to form a protective layer 137 and patterned to form a drain contact hole 171 on the drain electrode 131. On the gate pad 115, a gate pad contact hole 159 is formed to expose predetermined portions of the first and second dummy gate pads 119a and 119b. Continuous etching is performed using the first dummy gate pad 119a as a mask to etch the gate insulating layer 117 covering the gate pad 115, and to expose the gate pad 115 through the gate pad contact hole 159. On the source pad 125, a source pad contact hole 169 is formed.

By forming the gate insulating layer 117 and the protective layer 137 from the same material, such as silicon nitride, selective etching of only these layers can be performed during the continuous etching process, wherein the first dummy gate pad 119a serves as a mask during this continuous etching process. Furthermore, the protective layer 137, the first and second dummy gate pads 119a and 119b, and the gate insulating layer 117 define a stepped sidewall structure for the gate pad contact hole 159.

Figure 10F:
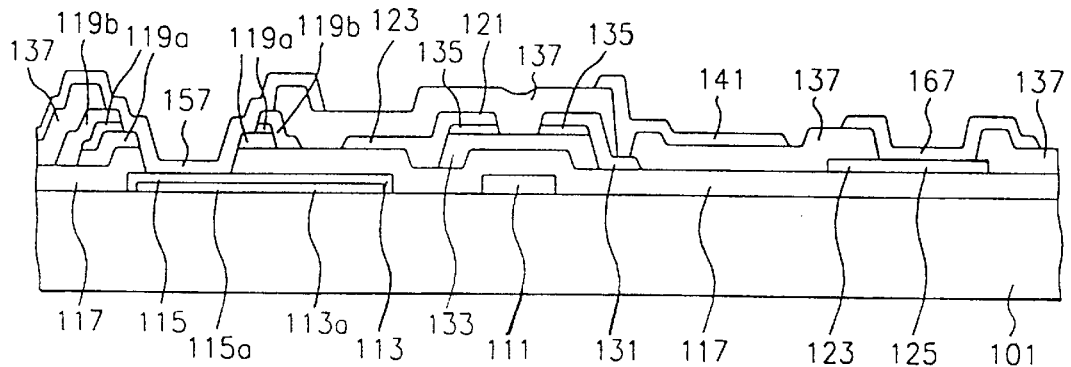

As shown in FIG. 10f, a transparent conductive material, such as indium tin oxide (ITO) is deposited on the protective layer 137, and patterned to form a pixel electrode 141, a gate pad connecting terminal 157, and a source pad connecting terminal 167. The pixel electrode 141 is connected with the drain electrode 131 through the drain contact hole 171. The gate pad connecting terminal 157 is connected with the first dummy gate pad 119a, the second dummy gate pad 119b, and the gate pad 115 through the gate pad contact hole 159. The source pad connecting terminal 167 is connected with the source pad 125 through the source pad contact hole 169.

In this example, the semiconductor layer 133 containing an intrinsic semiconductor material and a chromium metal, which forms the source electrode 121, are used to surround the steps of the gate insulating layer 117 covering the gate pad 115. As a result, penetration of an etchant through the weak portions (at or near the steps) of the gate insulating layer 117 is effectively prevented.

Figure 11A:
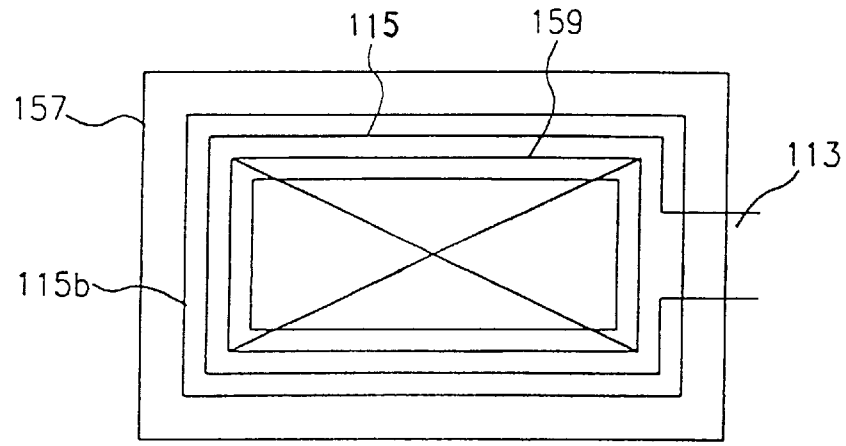
Figure 11B:
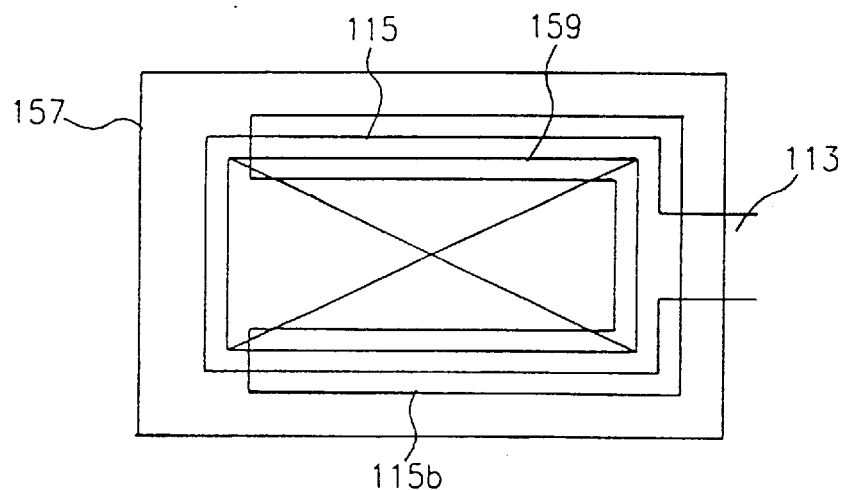
Figure 11B:
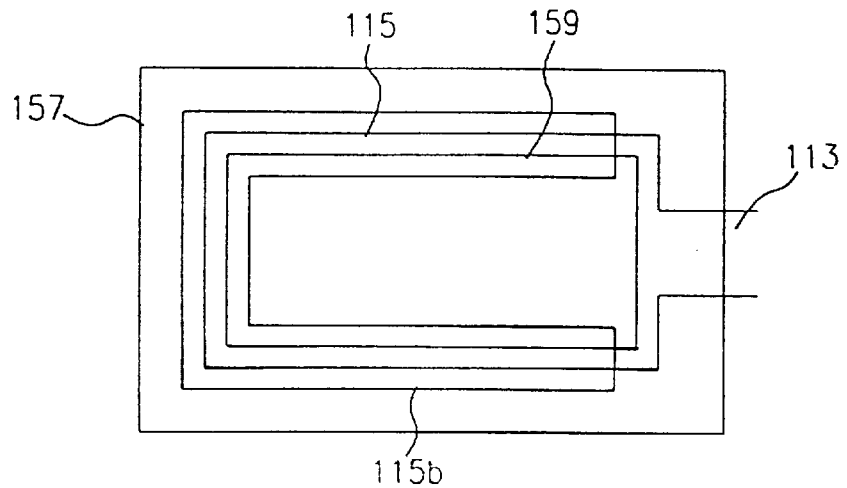

The above examples describe difference methods for forming a dummy gate pad surrounding and covering the peripheral edge portion of the gate pad 115. FIGS. 11a–11c show different configurations of the dummy gate pad 115b according to the embodiments of the present invention.

As shown in FIG. 11a, the dummy gate pad 115b completely surrounds and covers the gate pad 115. As shown in FIG. 11b, the dummy gate pad 115b may partially cover the portion where the gate pad 115 and gate line 113 meet such that one side or edge of the gate pad 115 is not covered. While these different configurations of the dummy gate pad have been described with respect to the dummy gate pad 115b, these configurations also apply to the dummy gate pads described in the other embodiments of the present invention.

THE ADVANTAGES OF THE PRESENT INVENTION

The present invention is directed to preventing defects in the gate pad portion due to etchant penetration. In the present invention, after the gate insulating layer is formed, a dummy gate pad made of at least one of a semiconductor material and a metal is formed over the periphery of the gate pad to prevent etchant from penetrating through the steps of the gate insulating layer.

In one embodiment, during the formation of the source electrodes, a dummy gate pad is formed over the gate insulating layer covering the outer edge or periphery of the gate pad. As a result, etchant is prevented from penetrating through the steps of the gate insulating layer covering the gate pad. Additionally, since the dummy gate pad is composed of a metal material and the dummy gate pad is connected with the gate pad, the contact resistance of the gate pad is reduced. Accordingly, by protecting the gate pad and lowering the resistance of the gate pad and line, horizontal luminance defects are prevented.

In another embodiment, a first dummy gate pad is formed with a semiconductor material, and a second dummy gate pad, covering the first dummy gate pad, is formed with the same metal material used to form the source electrode. In this situation, since the dummy gate pads are formed during difference manufacturing steps, each is used to prevent etchant penetration at different manufacturing stages. Also, since the second dummy gate pad includes a metal material, the contact resistance near the gate pad is reduced to prevent horizontal luminance defects. Additionally, by forming different sized first and second dummy gate pads, a gentle slope is formed near the gate contact hole which prevents partial erosion of the gate pad connecting terminal made of ITO.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of manufacturing a liquid crystal display, comprising the steps of:
    forming on a substrate, a gate line, at least one gate electrode branching out of the gate line, and a gate pad disposed at an end portion of said gate line, said gate pad having a periphery;
    forming a gate insulating layer over said substrate and on said gate line, said gate electrode, and said gate pad;
    forming a first protective layer on said gate insulating layer over at least a portion of said periphery of said gate pad; and
    etching said gate insulating layer using said first protective layer as a mask to form a gate pad contact hole exposing a portion of said gate pad.

2. The method of claim 1, further comprising the step of:
    forming a gate pad terminal on said gate pad and in contact with said gate pad via said gate pad contact hole.

3. A method of manufacturing a liquid crystal display, comprising the steps of:
    forming, on a substrate, a gate line, at least one gate electrode branching out of the gate line, and a gate pad disposed at an end portion of said gate line, said gate pad having a periphery;
    forming a gate insulating, layer over said substrate and on said gate line, said gate electrode, and said gate pad;
    forming a first protective layer on said gate insulating layer over at least a portion of said periphery of said gate pad;
    patterning a semiconductor material to form said first protective layer pad and a semiconductor layer over said gate electrode;
    patterning a first conductive material to form a drain electrode on a first portion of said semiconductor layer on a first side of said gate electrode and to form a source electrode on a second portion of said semiconductor layer on a second side of said gate electrode;
    forming a protective layer over said substrate; and
    selectively etching said protective layer to form a drain contact hole exposing said drain, and to form a portion of a gate pad contact hole over said gate pad which exposes a portion of said gate insulating layer over said gate pad and a portion of said first protective layer;
    selectively etching said gate insulating layer using said first protective layer as a mask to completely form said gate pad contact hole which exposes a portion of said gate pad; and
    patterning a second conductive material to form a gate pad terminal in contact with said gate pad via said gate pad contact hole and to form a pixel electrode in contact with said drain via said drain contact hole.

4. The method of claim 3, wherein
    said patterning a first conductive material step also forms a source line connected to said source and a source pad disposed at an end portion of said source line;
    said selectively etching said protective layer step forms a source pad contact hole exposing a portion of said source pad; and
    said patterning a second conductive material step forms a source pad terminal in contact with said source pad via said source pad contact hole.

5. The method of claim 3, wherein
    said patterning a first conductive material step also forms a second protective layer on said first protective layer; and
    said selectively etching said protective layer step forms said portion of said gate pad contact hole over said gate pad which also exposes a portion of said second protective layer.

6. The method of claim 5, wherein said patterning a first conductive material step forms said second protective layer such that said gate pad contact hole is defined by gradually, inwardly sloping side walls.

7. The method of claim 6, wherein said gradually, inwardly sloping side walls have a step structure.

8. The method of claim 3, wherein said protective layer, said first protective layer and said gate insulating layer define said gate pad contact hole having side walls with a step structure.

9. The method of claim 3, wherein said selectively etching said protective layer step and said selectively etching said gate insulating layer step are performed as a single continuous step.

10. A method of manufacturing a liquid crystal display, comprising the steps of:

forming, on a substrate, a gate line, at least one gate electrode branching out of the gate line, and a gate pad disposed at an end portion of said gate line, said gate pad having a periphery;

forming a gate insulating layer over said substrate and on said gate line, said gate electrode, and said gate pad;

forming a first protective layer on said gate insulating layer over at least a portion of said periphery of said gate pad;

patterning a semiconductor material to form a semiconductor layer over said gate electrode;

forming a protective layer over said substrate; and selectively etching said protective layer to form a drain contact hole exposing said drain, and to form a portion of a gate pad contact hole over said gate pad which exposes a portion of said gate insulating layer over said gate pad and a portion of said first protective layer; and selectively etching said gate insulating layer using said first protective layer as a mask to completely form said gate pad contact hole which exposes a portion of said gate pad;

patterning a second conducive material on form a gage pad terminal in contact with said gate pad via said gate pad contact hole and to form a pixel electrode in contact with said drain via said drain contact hole; and wherein said forming said first protective layer step patterns a first conductive material to form said first protective layer, to form a drain electrode on a first portion of said semiconductor layer on a first side of said gate electrode and to form a source electrode on a second portion of said semiconductor layer on a second side of said gate electrode.

11. The method of claim 10, wherein said forming said first dummy gate pads step also patterns said first conductive material to form a source line connected to said source and a source pad disposed at an end portion of said source line;

said selectively etching said protective layer step forms a source pad contact hole exposing a portion of said source pad; and said patterning a second conductive material step forms a source pad terminal in contact with said source pad via said source pad contact hole.

* * * * *